United States Patent
Wong et al.

(10) Patent No.: US 9,049,616 B2
(45) Date of Patent: Jun. 2, 2015

(54) SESSION RECOVERY AFTER NETWORK COORDINATOR OR AP RESTART FOR SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventors: Chiu Ngok Eric Wong, San Jose, CA (US); Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 229 days.

(21) Appl. No.: 13/836,267

(22) Filed: Mar. 15, 2013

(65) Prior Publication Data

US 2013/0258928 A1    Oct. 3, 2013

Related U.S. Application Data

(60) Provisional application No. 61/617,607, filed on Mar. 29, 2012, provisional application No. 61/776,725, filed on Mar. 11, 2013.

(51) Int. Cl.
*H04W 24/04* (2009.01)
*H04W 56/00* (2009.01)

(52) U.S. Cl.
CPC .......... *H04W 24/04* (2013.01); *H04W 56/001* (2013.01)

(58) Field of Classification Search
CPC .......................... H04W 24/04; H04W 56/001
USPC .......................................... 370/311, 336, 350
See application file for complete search history.

(56) References Cited

U.S. PATENT DOCUMENTS

| | | | | |
|---|---|---|---|---|
| 6,725,067 | B1 * | 4/2004 | Marx et al. ................ | 455/574 |
| 7,400,895 | B2 * | 7/2008 | Chang et al. .............. | 455/502 |
| 7,433,321 | B2 * | 10/2008 | Grilli et al. ............... | 370/252 |
| 7,535,884 | B2 * | 5/2009 | Stephenson et al. ...... | 370/338 |
| 8,644,203 | B2 * | 2/2014 | Leussink ................... | 370/311 |
| 2010/0284316 | A1 * | 11/2010 | Sampathkumar .......... | 370/311 |
| 2013/0077610 | A1 * | 3/2013 | Amini et al. .............. | 370/338 |

* cited by examiner

*Primary Examiner* — Rasheed Gidado
(74) *Attorney, Agent, or Firm* — Garlick & Markison; Shayne X. Short

(57) ABSTRACT

Session recovery after network coordinator or AP restart for single user, multiple user, multiple access, and/or MIMO wireless communications. Restart or reset of a network coordinator (e.g., an access point (AP) or other network coordinator type device) may occur for various reasons (e.g., a power cycle or power failure, inadequate failover protection, scheduled or planned power outages such as for including network maintenance, software upgrades, etc.). Upon determination of network coordinator restarted or reset, a singular bit within a communication from the network coordinator indicates synchronization or not of the its timing synchronization function (TSF) (e.g., with other devices in the communication system, such as wireless stations (STAs), smart meter stations (SMSTAs), etc.). A given device (e.g., STA, SMSTA, etc.) can provide its current TSF to the network coordinator so that it can resynchronize, re-establish its scheduled for wake times of those devices (e.g., target wake times (TWTs)), etc.

20 Claims, 14 Drawing Sheets

1200

| encryption key | size (bits) |
|---|---|
| temporal key (TK) | 256 (TKIP) 128 (CCMP) |
| group temporal key (GTK) | 256 (TKIP) 128 (CCMP) |
| message integrity code key (MIC) | 64 |
| EAPOL-key confirmation key (KCK) | 128 |
| EAPOL-key encryption key (KEK) | 128 |

- storing session encryption key

FIG. 12

SESSION RECOVERY AFTER NETWORK COORDINATOR OR AP RESTART FOR SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent App. claims priority pursuant to 35 U.S.C. §119(e) to the following U.S. Provisional Patent Apps. which are hereby incorporated herein by reference in their entirety and made part of the present U.S. Utility Patent App. for all purposes:

1 and 2. U.S. Provisional Patent App. Ser. No. 61/617,607 and 61/776,725, both entitled "Session recovery after network coordinator or AP restart for single user, multiple user, multiple access, and/or MIMO wireless communications," (Attorney Docket Nos. BP24611 and BP24611.1, respectively), filed Mar. 29, 2012 and Mar. 11, 2013, respectively, both pending.

INCORPORATION BY REFERENCE

The following IEEE standards/draft standards are hereby incorporated herein by reference in their entirety and are made part of the present U.S. Utility Patent Application for all purposes:

1. IEEE Std 802.11™—2012, "IEEE Standard for Information technology—Telecommunications and information exchange between systems—Local and metropolitan area Networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™—2012, (Revision of IEEE Std 802.11—2007), 2793 total pages (incl. pp. i-xcvi, 1-2695).

2. IEEE Std 802.11n™—2009, "IEEE Standard for Information technology—Telecommunications and information exchange between systems—Local and metropolitan area Networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 total pages (incl. pp. i-xxxii, 1-502).

3. IEEE P802.11ac™/D4.1, November 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 420 total pages (incl. pp. i-xxv, 1-395).

4. IEEE P802.11ad™/D9.0, July 2012, (Draft Amendment based on IEEE 802.11—2012) (Amendment to IEEE 802.11—2012 as amended by IEEE 802.11ae—2012 and IEEE 802.11aa—2012), "IEEE P802.11ad™/D9.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 679 total pages.

5. IEEE Std 802.11ae™—2012, "IEEE Standard for Information technology—Telecommunications and information exchange between systems—Local and metropolitan area Networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™—2012, (Amendment to IEEE Std 802.11™—2012), 52 total pages (incl. pp. i-xii, 1-38).

6. IEEE P802.11af™/D2.2, November 2012, (Amendment to IEEE Std 802.11™—2012, as amended by IEEE Std 802.11ae™—2012, IEEE Std 802.11aa™—2012, IEEE Std 802.11ad™/D9.0, and IEEE Std 802.11ac™/D4.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 324 total pages (incl. pp. i-xxiv, 1-300).

BACKGROUND OF THE INVENTION

1. Technical Field of the Invention

The invention relates generally to communication systems; and, more particularly, it relates to session recovery after a restart of at least one communication device within single user, multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

With various types of wireless communications (e.g., single-output-single-input (SISO), multiple-input-single-output (MISO), single-input-multiple-output (SIMO), and multiple-input-multiple-output (MIMO)), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs. Therefore, a need exists for a WLAN device that is capable of high data throughput and is backward compatible with legacy devices.

BRIEF DESCRIPTION OF THE SEVERAL VIEWS OF THE DRAWINGS

FIG. 12 illustrates an embodiment of storing session encryption key.

DETAILED DESCRIPTION OF THE INVENTION

Figure 1:
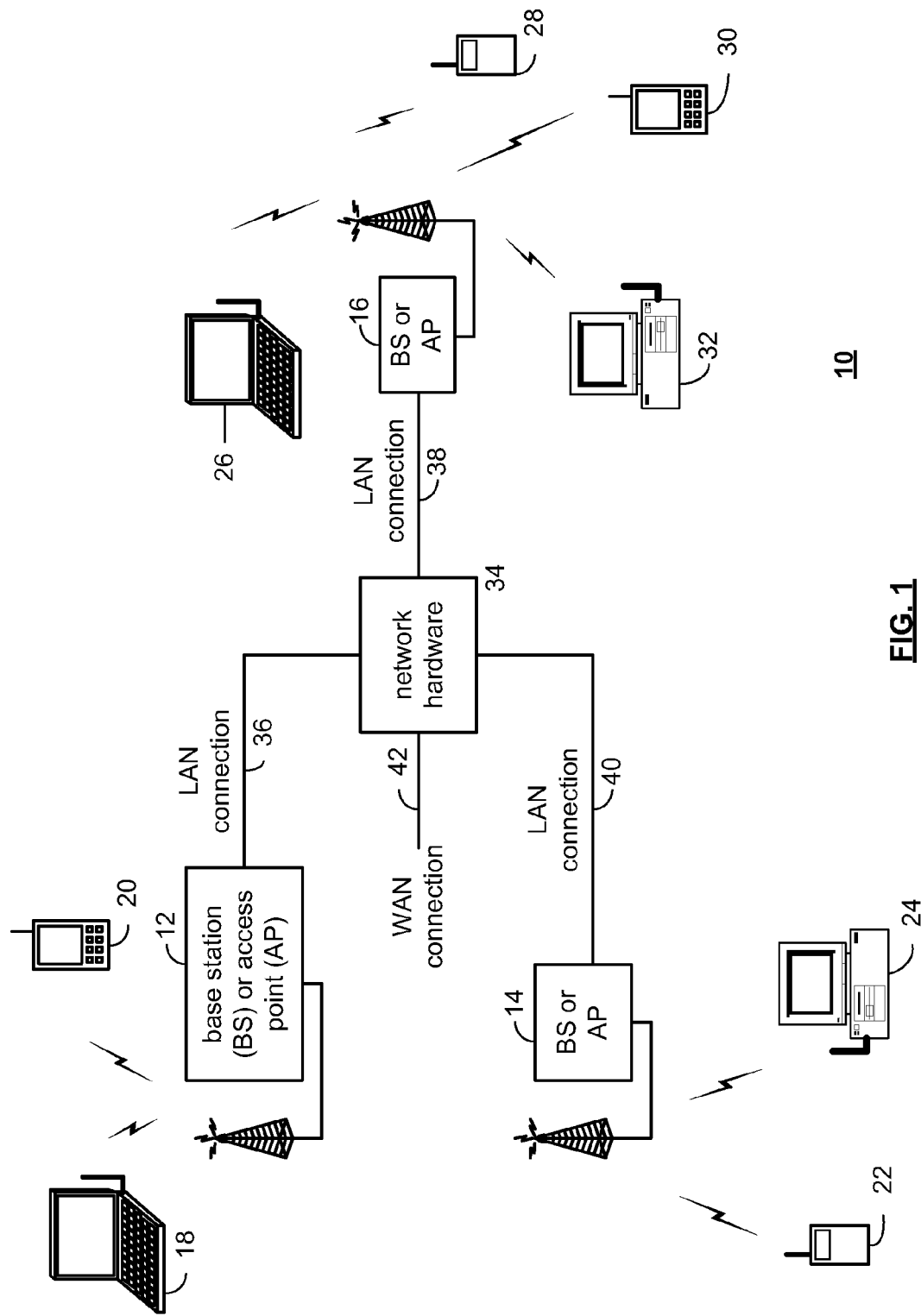
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
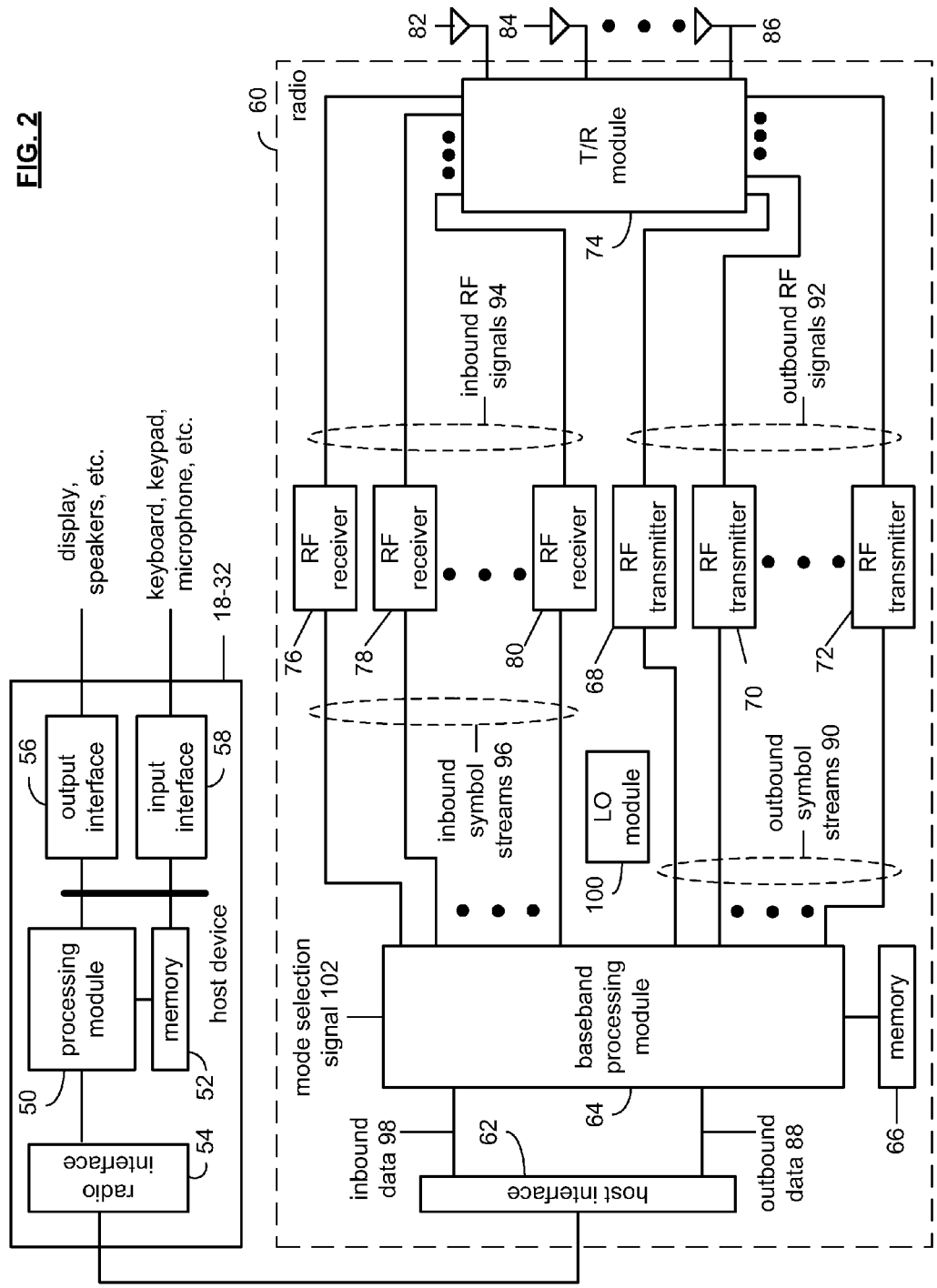
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode (e.g., such as may be identified in corresponding mode selection table(s)), which appear at the end of the detailed discussion. For example, the mode selection signal 102, may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As may also be understood, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode. It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80 converts the inbound RF signals 94 into a corresponding number of inbound symbol streams 96. The number of inbound symbol streams 96 will correspond to the particular mode in which the data was received (recall that the mode may be any modes indicated in mode selection table(s)). The baseband processing module 64 receives the inbound symbol streams 96 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
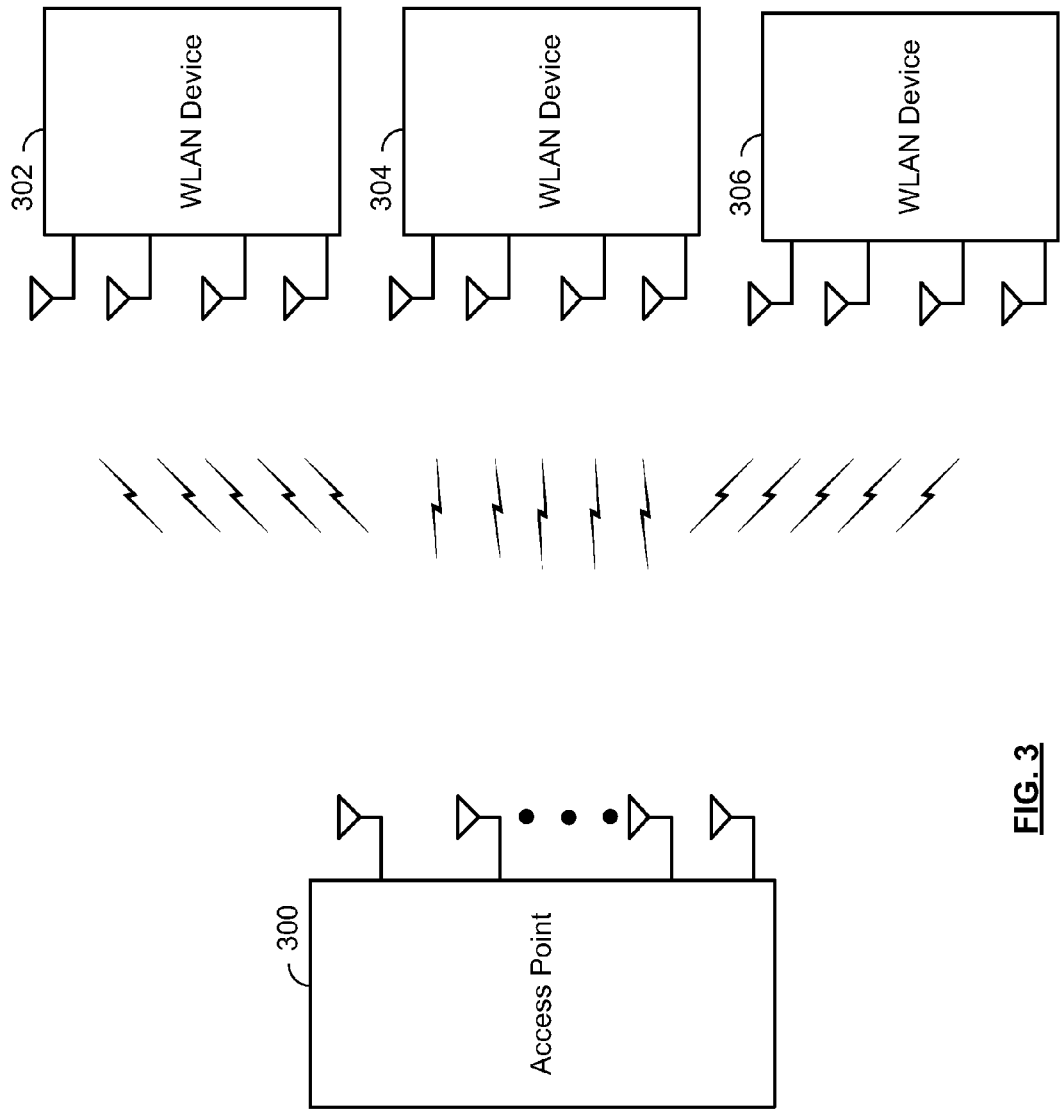
FIG. 3 is a diagram illustrating an embodiment of an access point (AP) and multiple wireless local area network (WLAN) devices operating according to one or more various aspects and/or embodiments of the invention.

FIG. 3 is a diagram illustrating an embodiment of an access point (AP) and multiple wireless local area network (WLAN) devices operating according to one or more various aspects and/or embodiments of the invention. The AP point 300 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 300 supports communications with the WLAN devices 302, 304, and 306 with channel bandwidths, MIMO dimensions, and at data throughput rates unsupported by the prior IEEE 802.11x operating standards. For example, the access point 300 and WLAN devices 302, 304, and 306 may support channel bandwidths from those of prior version devices and from 40 MHz to 1.28 GHz and above. The access point 300 and WLAN devices 302, 304, and 306 support MIMO dimensions to 4×4 and greater. With these characteristics, the access point 300 and WLAN devices 302, 304, and 306 may support data throughput rates to 1 GHz and above.

The AP 300 supports simultaneous communications with more than one of the WLAN devices 302, 304, and 306. Simultaneous communications may be serviced via OFDM tone allocations (e.g., certain number of OFDM tones in a given cluster), MIMO dimension multiplexing, or via other techniques. With some simultaneous communications, the AP 300 may allocate one or more of the multiple antennae thereof respectively to support communication with each WLAN device 302, 304, and 306, for example.

Further, the AP 300 and WLAN devices 302, 304, and 306 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of the sets of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 4:
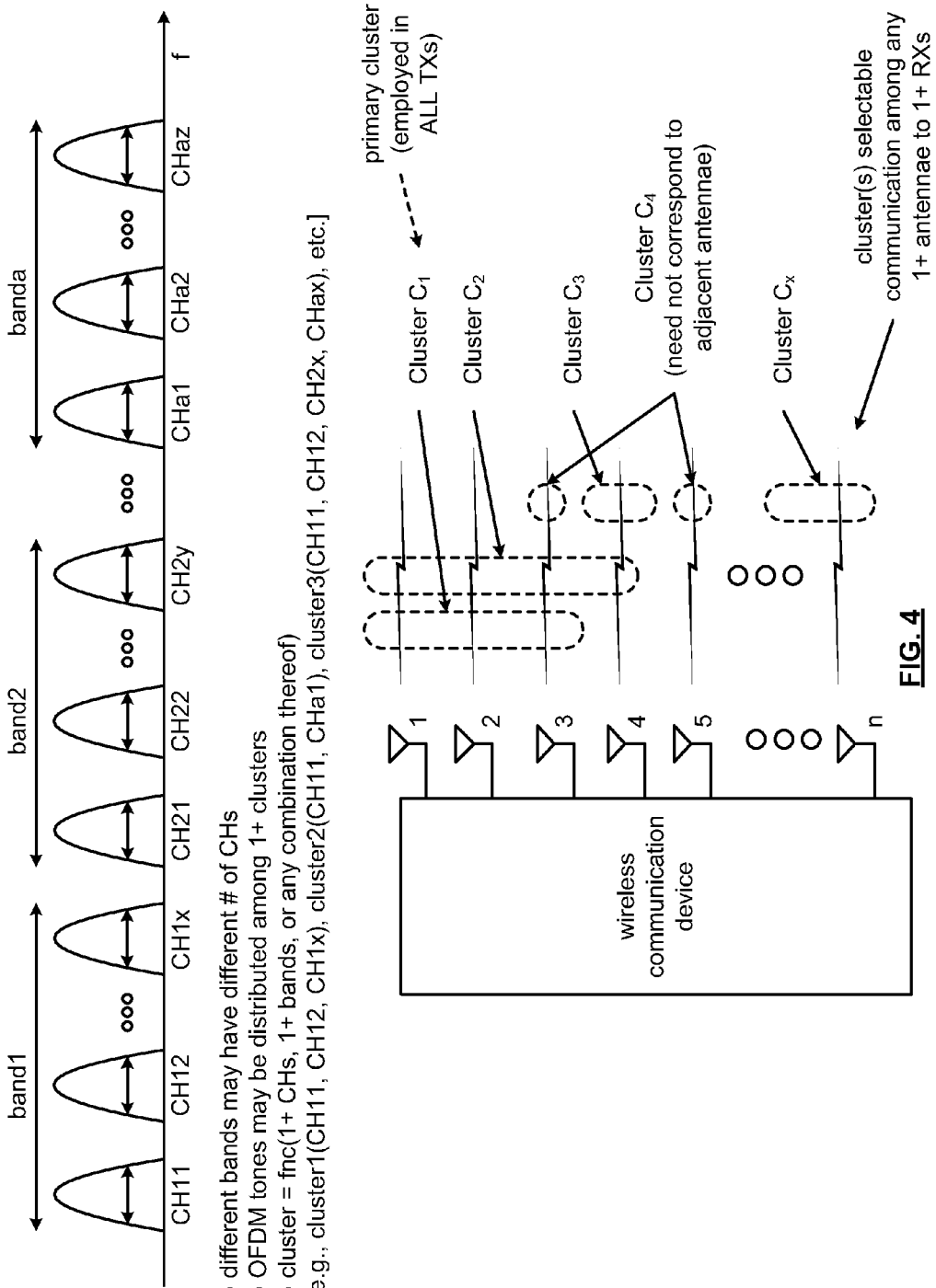
FIG. 4 is a diagram illustrating an embodiment of a wireless communication device, and clusters, as may be employed for supporting communications with at least one additional wireless communication device.

FIG. 4 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination of one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device. Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

Figure 5:
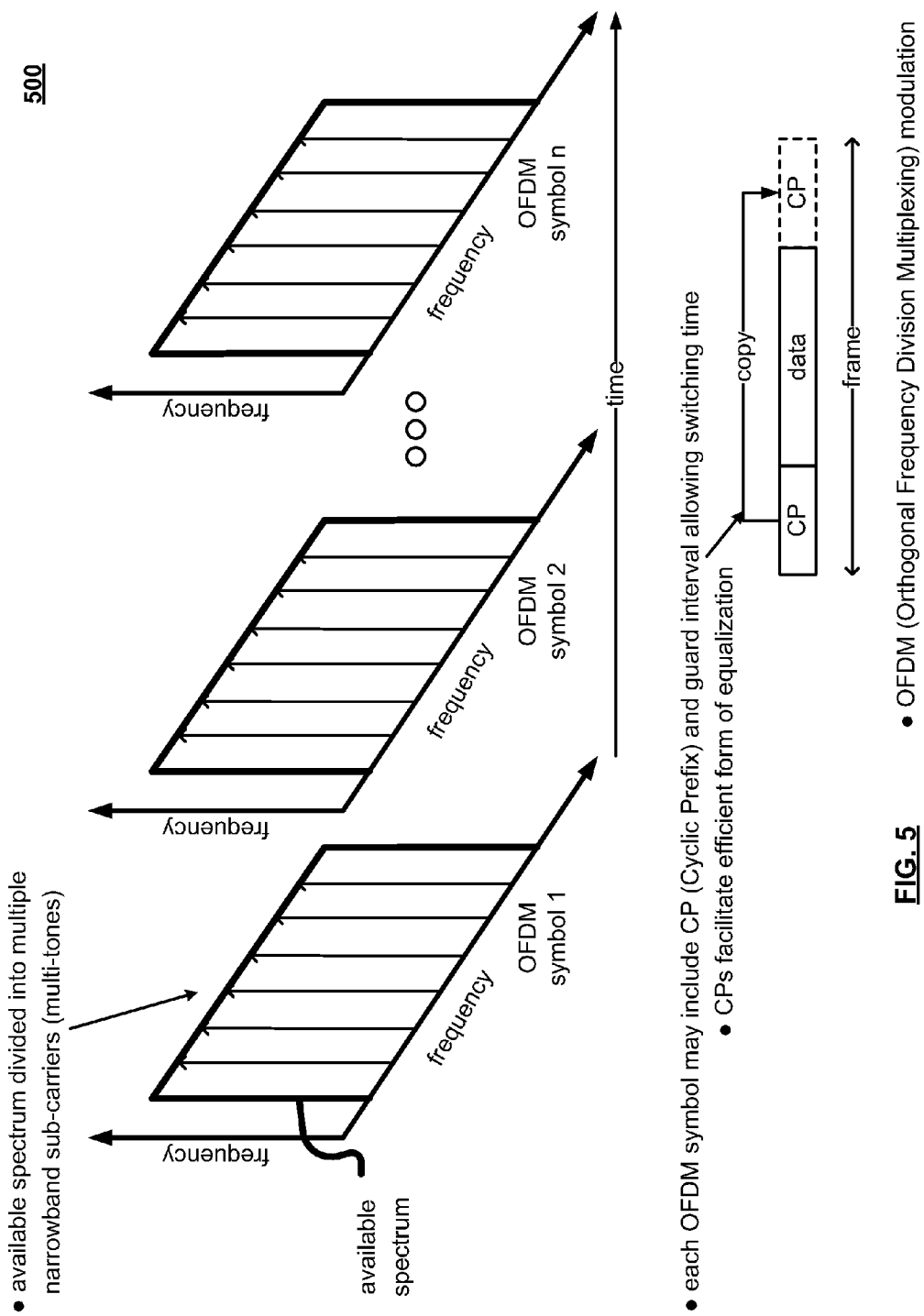
FIG. 5 illustrates an embodiment of OFDM (Orthogonal Frequency Division Multiplexing).

FIG. 5 illustrates an embodiment 500 of OFDM (Orthogonal Frequency Division Multiplexing). OFDM modulation may be viewed as dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation coding techniques.

OFDM modulation operates by performing simultaneous transmission of a larger number of narrowband carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols. Generally speaking, OFDM system design is based on the expected delay spread within the communication system (e.g., the expected delay spread of the communication channel).

In certain instances, various wireless communication devices may be implemented to support communications associated with monitoring and/or sensing of any of a variety of different conditions, parameters, etc. and provide such information to another wireless communication device. For example, in some instances, a wireless communication device may be implemented as a smart meter station (SMSTA), having certain characteristics similar to a wireless station (STA) such as in the context of a wireless local area network (WLAN), yet is operative to perform such communications associated with one or more measurements in accordance with monitoring and/or sensing. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage of the periods of time in which the device is in such a power savings mode).

For example, such a device may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may also perform transmission of such information to another wireless communication device (e.g., an access point (AP), another SMSTA, a wireless station (STA), or such an SMSTA or STA operating as an AP, etc.). It is noted that such a device may enter into an operational mode for performing sensing and/or monitoring at a frequency that is different than (e.g., greater than) the frequency at which the device enters into an operational mode for performing transmissions. For example, such a device may awaken a certain number of times to make successive respective sensing and/or monitoring operations, and such data as is acquired during those operations may be stored (e.g., in a memory storage component within the device), and during a subsequent operational mode dedicated for transmission of the data, multiple data portions corresponding to multiple respective sensing and/or monitoring operations may be transmitted during that operational mode dedicated for transmission of the data.

Also, it is noted that, in certain embodiments, such a device may include both monitor and/or sensor capability as well as wireless communication capability. In other embodiments, such a device may be connected and/or coupled to a monitor and/or sensor and serve to effectuate wireless communications related to the monitoring and/or sensing operations of the monitor and/or sensor.

The application contexts of such devices may be very, and some exemplary those non-exhaustive embodiments are provided in described below for illustrations the reader. It is also noted that, in some applications, some of the devices may be battery operated in which energy conservation and efficiency may be of high importance. In addition, there are a number of applications in which such devices may be used besides in accordance with smart meter applications; for example, certain wireless communication devices may be implemented to support cellular offload and/or other applications that are not normally or traditionally associated with WLAN applications. Some applications are particularly targeted and directed towards use in accordance with and in compliance with the currently developing IEEE 802.11ah standard.

It is noted that the in accordance with various aspects, and their equivalents, of the invention described herein may be generally applied to wireless communication devices including any number of types of wireless communication devices (e.g., STAs, APs, SMSTAs, and/or any combination thereof, etc.), certain desired embodiments are particularly tailored towards use with one or more SMSTAs.

Figure 6:
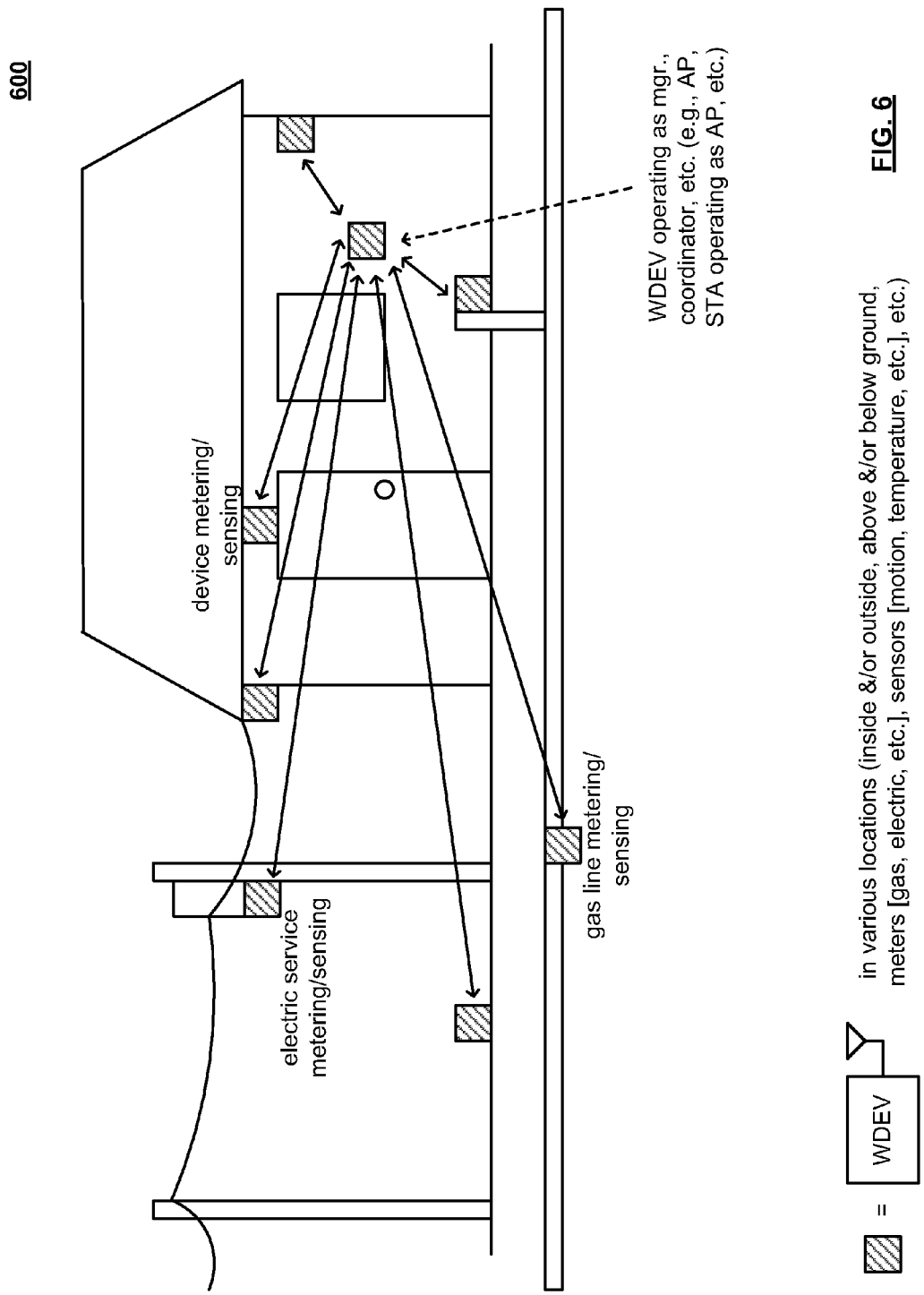
FIG. 6 illustrates an embodiment of a number of wireless communication devices implemented in various locations in an environment including a building or structure.

FIG. 6 illustrates an embodiment 600 of a number of wireless communication devices implemented in various locations in an environment including a building or structure. In this diagram, multiple respective wireless communication devices are implemented to forward information related to monitoring and/or sensing to one particular wireless communication device that may be operating as a manager, coordinator, etc. such as may be implemented by an access point (AP) or a wireless station (STA) operating as an AP. Generally speaking, such wireless communication devices may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, temperature measurement (and/or other atmospheric and/or environmental measurements), etc. may be performed by different respective monitors and/or sensors implemented in various locations and for various purposes.

Different respective monitors and/or sensors may be implemented to provide information related to such monitoring and/or sensing functions wirelessly to the manager/coordinator wireless communication device. Such information may be provided continuously, sporadically, intermittently, etc. as may be desired in certain applications. In addition, such communications between such a manager/coordinator wireless communication device of the different respective monitors and/or sensors may be cooperative in accordance with such bidirectional indications, in that, the manager/coordinator wireless communication device may direct the respective monitors and/or sensors to perform certain related functions at subsequent times.

Figure 7:
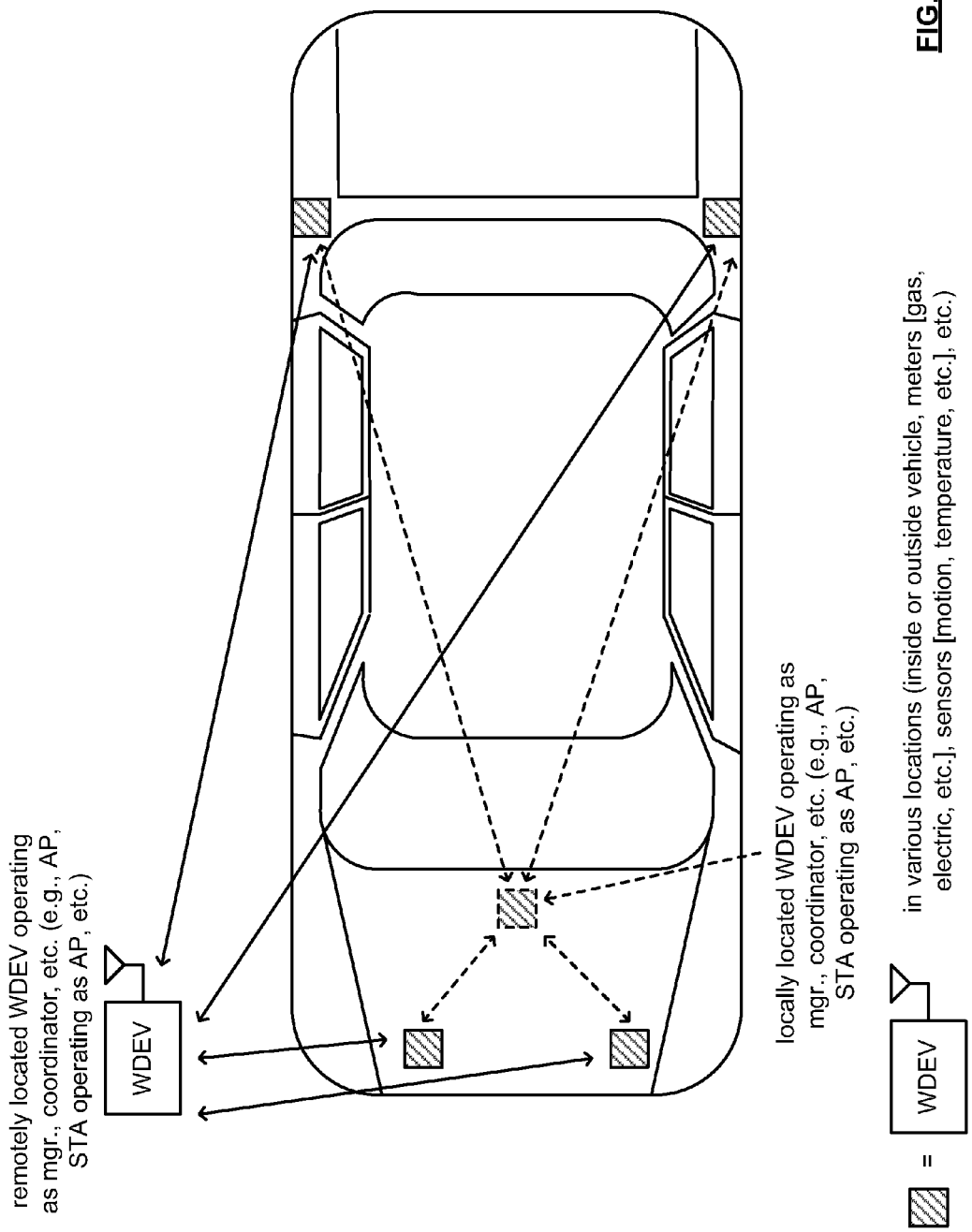
FIG. 7 illustrates an embodiment of a number of wireless communication devices implemented in various locations in a vehicular environment.

FIG. 7 illustrates an embodiment 700 of a number of wireless communication devices implemented in various locations in a vehicular environment. This diagram pictorially depicts a number of different sensors implemented throughout a vehicle which may perform any of a number of monitoring and/or sensing functions. For example, operational characteristics associated with different mechanical components (e.g., temperature, operating condition, etc. of any of a number of components within the vehicle, such as the engine, compressors, pumps, batteries, etc.) may all be monitored and information related to that monitoring may be provided to a coordinator/manager wireless communication device.

Figure 8:
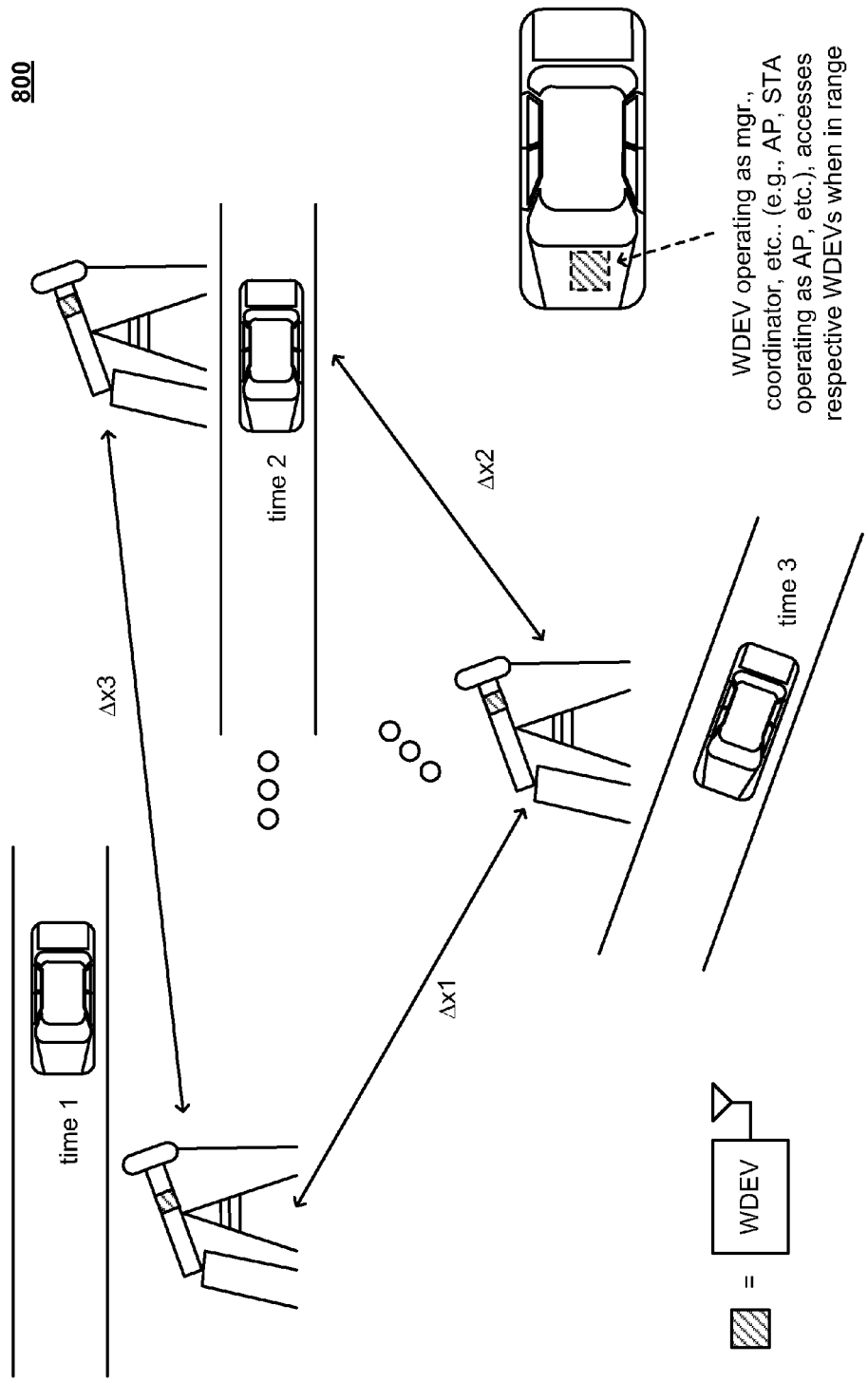
FIG. 8 illustrates an embodiment of a number of wireless communication devices implemented in various locations throughout a broadly distributed industrial environment.

FIG. 8 illustrates an embodiment 800 of a number of wireless communication devices implemented in various locations throughout a broadly distributed industrial environment. This diagram pictorially illustrates a number of different respective sensors that may be implemented in various locations are very remote with respect to one another. This diagram relates to a number of sensors was may be implemented within different locations that have little or no wireless communication infrastructure associated therewith. For example, in the oil industry, different respective pumps may be implemented in very remote locations, and service personnel need physically to visit the different respective locations to ascertain the operation of the various equipment and components there. A manager/coordinator wireless communication device may be implemented within a vehicle, or within a portable component such as laptop computer included within the vehicle, and as the vehicle travels to each respective location in which there are such sensing and/or monitoring devices. As the manager/coordinator wireless communication device enters within sufficient proximity such that wireless communication may be supported with the different respective sensing and/or monitoring devices, information related to such monitoring and/or sensing functions may be provided to the manager/ordinate wireless communication device.

While various respective and exemplary embodiments have been provided here for illustration to the reader, it is noted that such applications are non-exhaustive and that any of a variety of application contexts may be implemented such that one or more wireless communication devices are implemented throughout an area such that those one or more wireless communication devices may only occasionally provide information to a manager/ordinate wireless communication device. Any such application or communication system may operate in accordance with the in accordance with various aspects, and their equivalents, of the invention.

Within various types of communication systems, including those which may include one or more wireless communication devices that are awake, active, etc. only a relatively small portion or percentage of the time, a restart of a network coordinator (e.g., an access point (AP) or other network coordinator type device) may occur for any of a number of reasons. For example, a power cycle or power failure may result in such a restart. In certain instances, a power failure may exceed the period of time in which power may be provided via a battery backup, and if there is inadequate failover protection, such a device may undergo a restart. In addition, sometimes scheduled or planned power outages occur for any of a number of reasons including network maintenance, software upgrades, etc.

For example, in the context of wireless communication systems operating in accordance with the developing IEEE 802.11ah, certain embodiments envision a significant number of wireless stations (e.g., which may include several thousand STAs, smart meter devices, etc.) in communication with as few as one single network coordinator. Again, in some embodiments, there may be a wide range of operability of the various communication devices therein. For example, certain of the wireless communication devices may be in and inactive, reduced functionality, or sleep mode during a majority of the time such that they are infrequently operable devices (e.g., awaking only at certain times to effectuate transmission and/or receipt of one or more signals). In such application contexts, when such a network coordinator (e.g., AP) undergoes a restart, the network coordinator (e.g., AP) may lose association with a number of these respective wireless communication devices, lose timing synchronization function (TSF), lose association ID (AID) for the respective devices, lose the traffic indication map (TIM) associated with the respective devices, and/or lose session encryption keys associated with the respective devices. That is to say, the respective association attributes which were previously in use are no longer valid after such a restart.

In addition, devices awakened from a relatively long period of sleep may be unaware of such a restart of the network coordinator (e.g., AP). As such, certain of the devices may be required to repeat association, authentication, etc. to resume and effectuate communications within the communication system. In addition, an invalid TIM bitmap may unfortunately mislead certain devices to operate in undesired ways. For example, after a reset, such a network coordinator (e.g., AP) may send out new beacons, management frames, and/or other communications after such a restart. However, if a particular device was asleep when such information was sent out, then that device won't know about or be informed of this new information (e.g., beacons, management frames, and/or other communications).

In accordance with operating after such a restart has occurred, certain steps may typically be performed for association, authentication, etc. for a particular device to regain access to the communication network. For example, in association request and response exchange may occur. Also, device and/or user authentication may occur, and key generation and distribution may also occur. Such operational steps for a device to be gain network access may take a relatively significant amount of time. In addition, depending upon the authentication mode being employed, multiple respective frame transactions lasting several seconds may be needed (e.g., lasting approximately 2 to 3 seconds).

For example, considering a concrete example, authentication exchanges have been measured at one particular Wi-Fi implementation required an associated 28 frame exchanges between the respective wireless communication devices (e.g. STAs) in the network coordinator (e.g., AP) lasting a relatively long period of time (e.g., approximate 2.78 seconds). This was measured starting from start of an extensible authentication protocol (EAP) over local area network (LAN) (alternatively referred to as EAPOL-Start) to EAP-success.

Again, as mentioned elsewhere herein, certain embodiments of a basic services set (BSS) operative in accordance with the developing IEEE 802.11ah may include a significant large number of devices. Considering embodiment including 6000 smart meter devices, and assuming that each respective device takes approximately 3 seconds on average for association authentication, then the time required to effectuate association on authentication for those respective devices would be approximate 6000×3 seconds=12.5 days to reattach all of the respective smart meters to the BSS. Again, considering even a best case scenario of such an embodiment including several thousand wireless devices (e.g., 6000 smart meters), almost two weeks would be necessitated to effectuate reattachment of all the respective smart meters to an AP in such a BSS. In addition, it is noted that such a consideration is not necessarily accounting for access delay, traffic from other non-smart meter devices, and/or extra power consumed associated with effectuating reattachment of such devices within a BSS after a restart of the AP. A worst-case scenario could take significantly longer than two weeks to effectuate reattachment of all the respective smart meters.

As may be understood, a number of deleterious effects may occur based upon the restart of a network coordinator (e.g., AP). There may be a significant loss of throughput performance, unstable behavior from smart meters with relatively short wake and long sleep times may occur, a relatively lengthy BSS recovery time may be exhibited (bounded by the longest sleep time of the respective devices within the network), and/or an increase in power consumption may be effectuated at respective client devices within the network. In addition, after such a restart, based upon AID reassignments, a given AID may unfortunately be reassigned to a different device. In certain instances two or more respective devices may have the same AID assigned thereto which could become problematic.

Generally speaking, such an appropriately designed approach for dealing with such a restart should achieve high availability with a minimal amount of network management required. Herein, a number of different embodiments and approaches are presented by which one or more devices may detect a restart of another device within the network (e.g., a network coordinator, AP, etc.). Also, recovery of a timing synchronization function (TSF) timer may be made based on certain of the various embodiments and approaches presented. As may also be understood, certain aspects provided by such embodiments and approaches presented herein allow for the avoidance of repeating association on authentication for all of the devices within the system as well as allow for restoration of association attributes at the network coordinator (e.g., AP) as well. In certain embodiments, such as those operating in accordance with residential contexts, approximately 3 respective smart meters may be implemented with respect to each respective home, apartment, etc. For example, three respective smart meters may be implemented: a first smart meter associated with the electric power system, a second smart meter associated with a natural gas delivery system, and a third smart meter associated with a water delivery and/or sewer system, each respectively operative to effectuate certain purposes such as revenue metering. Of course, different respective embodiments may include fewer or more respective smart meters associated with each respective home, apartment, etc. In addition, similar implementations of smart meters may be implemented with respect to commercial properties as well without departing from the scope and spirit of the invention.

Figure 9:
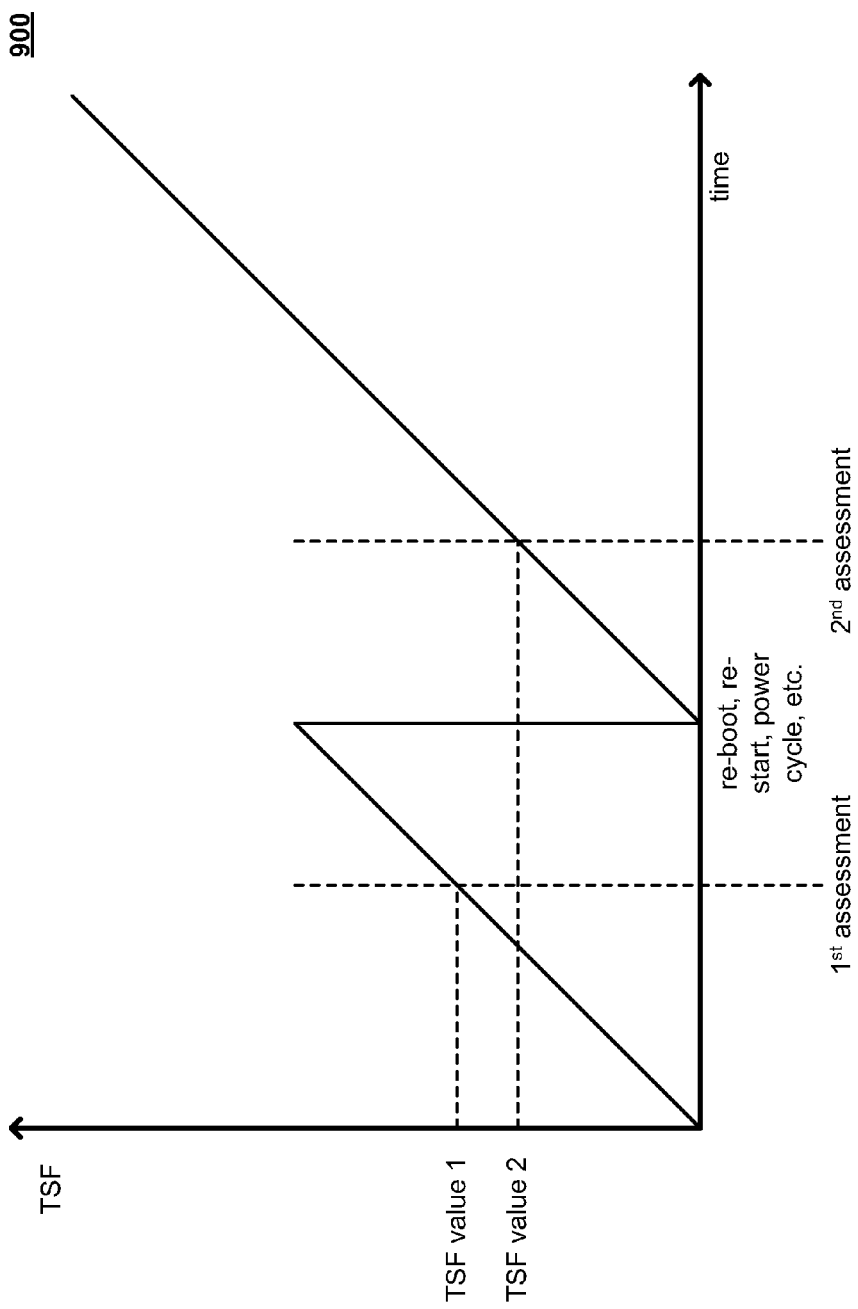
FIG. 9 illustrates an embodiment of restart detection of a communication device.

FIG. 9 illustrates an embodiment 900 of restart detection of a communication device. As may be seen with respect to this diagram, one manner by which a restart of a network coordinator (e.g., AP) sees may be made is by assessing or monitoring the value of the TSF timer. For example, based upon the identification of a given or current TSF value being less than a prior TSF value, such a restart may be detected. Such a TSF timer may be viewed as being the common BSS clock that is maintained at the network coordinator (e.g., AP), and such a TSF timer may be denoted by an 8 byte timestamp field. When such a network coordinator (e.g., AP) first boots up, the TSF timer begins counting starting from zero (0). Such a TSF timer increases in incremental steps of a particular duration (e.g., steps of 1 μs). The TSF timer wraps around in 585 millennia (that is, after 585,000 years) in considering and 8 byte TSF timer. Also, such a network coordinator (e.g., AP) reset its respective TSF timer back to zero after every restart. A device may be implemented to detect the restart of a network coordinator (e.g., AP) (at least once) of the received TSF timer as being relatively less than the next expected value. That is to say, the value of the TSF timer should be continually increasing in size until it wraps around after approximately 585,000 years. If a first TSF value is assessed, and then a second TSF value is assessed at a later time such that the second TSF value is relatively less than the first TSF value, then a restart of the network coordinator (e.g., AP) may be detected. Considering a concrete example, if the first time that a device associates with a network coordinator (e.g., AP), that device identifies the TSF value of 1000 and increasing, and then during a second time that that same device associates with a network coordinator (e.g., AP), that device identifies the TSF value as being 100 and increasing, then that particular device may detect that a restart of the network coordinator (e.g., AP) has in fact occurred.

Figure 10:
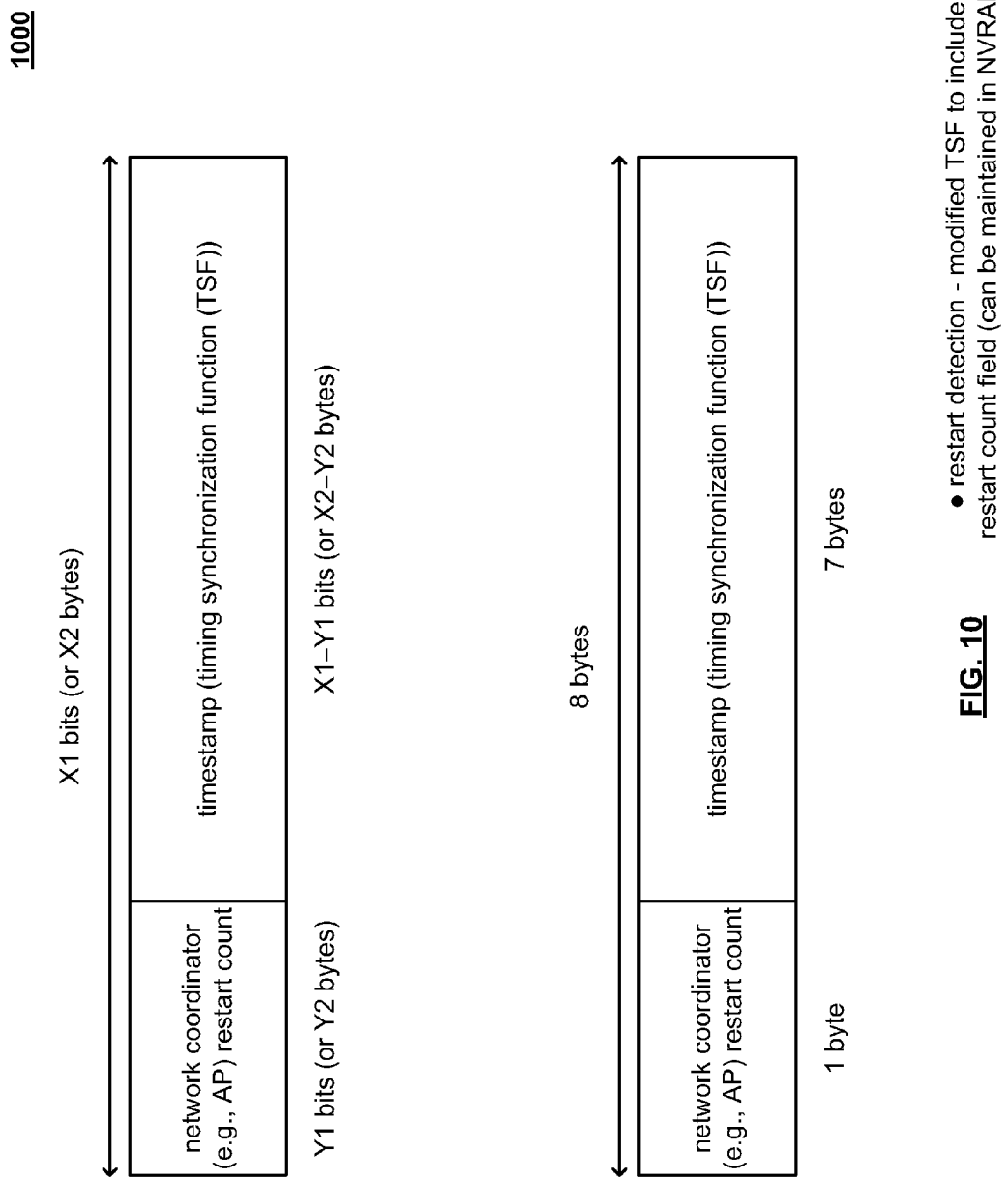
FIG. 10 illustrates an alternative embodiment of restart detection of a communication device.

FIG. 10 illustrates an alternative embodiment 1000 of restart detection of a communication device. Considering the very long time duration at which the TSF timer wraps around (e.g., proximally 585,000 years), one possible embodiment operates by adding a new restart count field to the timestamp and/or TSF. That is to say, a new field may be added to the timestamp and/or TSF to indicate the number of network coordinator (e.g., AP) restarts that has occurred. Generally speaking, any desired number of bits or bytes may be allocated for such a network coordinator (e.g., AP) restart count. In one preferred embodiment, 1 out of 8 bytes of the timestamp and/or TSF is dedicated and employed for the network coordinator (e.g., AP) restart count. Considering even a 7 byte TSF timer (e.g., considering employing 1 of the bytes for the network coordinator (e.g., AP) restart count), even such a modified 7 byte TSF timer would wrap around only in approximately 2.28 millennia (that is, after 2280 years). In one possible embodiment, such a network coordinator (e.g., AP) restart count and/or TSF timer may be maintained in a non-volatile random access memory (NVRAM) implemented within such a network coordinator (e.g., AP), so that even in the event of a hard power failure, such information could subsequently be retrieved there from. Using such an approach, a given device can detect with great specificity the number of restarts performed by a network coordinator (e.g., AP) based on changes to the value in such a network coordinator restart (e.g., AP) count field.

With respect to network coordinator recovery indication, a network coordinator with associated devices restarts, and then loses BSS attributes. As described elsewhere herein, there are at least two alternative ways by which a restart may be determined: by assessing the TSF value or a network coordinator restart count field within the TSF timer.

In addition, one or more new fields or information elements (IE(s)) may be included within beacons to indicate information that may need to be updated from certain respective communication devices. For example, such information may be included within beacons or in one or more new information elements. For example, a number of respective types of information may need updating. The TSF itself may need updating, which may be BSS specific. In addition, an AID (which is device specific) may optionally be updated and/or reassigned. Also, a target weight time (TWT) (which is despite specific) may also optionally be updated and/or reassigned.

A given device may receive a beacon from a network coordinator with a recovery indication therein. Based on this recovery indication, that device may send a recovery request action frame to the network coordinator. Based upon such an exchange, the network coordinator (e.g., AP) may update the TSF timer for the BSS, and then send a recovery response (e.g., such as an acknowledgment to the recovery request action frame) to indicate the respective success or failure of the update of the TSF timer.

With respect to TSF timer recovery associated with a network coordinator, if such a network coordinator resets its TSF timer, then there may be some instances in which a great number of devices (e.g., several thousand devices in a smart meter type application) fall out of time synchronization. Consequently, most of these respective devices would then wake up at the incorrect time and miss the beacon (which would typically be transmitted at the target beacon transmit time (TBTT)). That is to say, if a given device wakes up based on a prior TSF timer-based synchronization, then there is a high likelihood that a subsequent wake up of that same device, after a restart of the network coordinator in which the TSF timer associated there with his reset as well, would not occur at the proper time. Consequently, in some embodiments, each respective device would either have to stay awake and wait until the next received beacon, or each respective device would need to send a probe request to the network coordinator. However, again, considering an embodiment having a great number of devices (e.g., several thousand devices), it may be understood that it may be inefficient or undesirable if every respective device within the system operates in accordance with this manner. Instead, rather than updating the TSF timers associated with all of the respective devices within the network, the TSF timer associated with the network coordinator (e.g., AP) could instead be updated with the current TSF timer which may be provided from one of the devices within the system (e.g., provided from the next waking device within the system).

Figure 11:
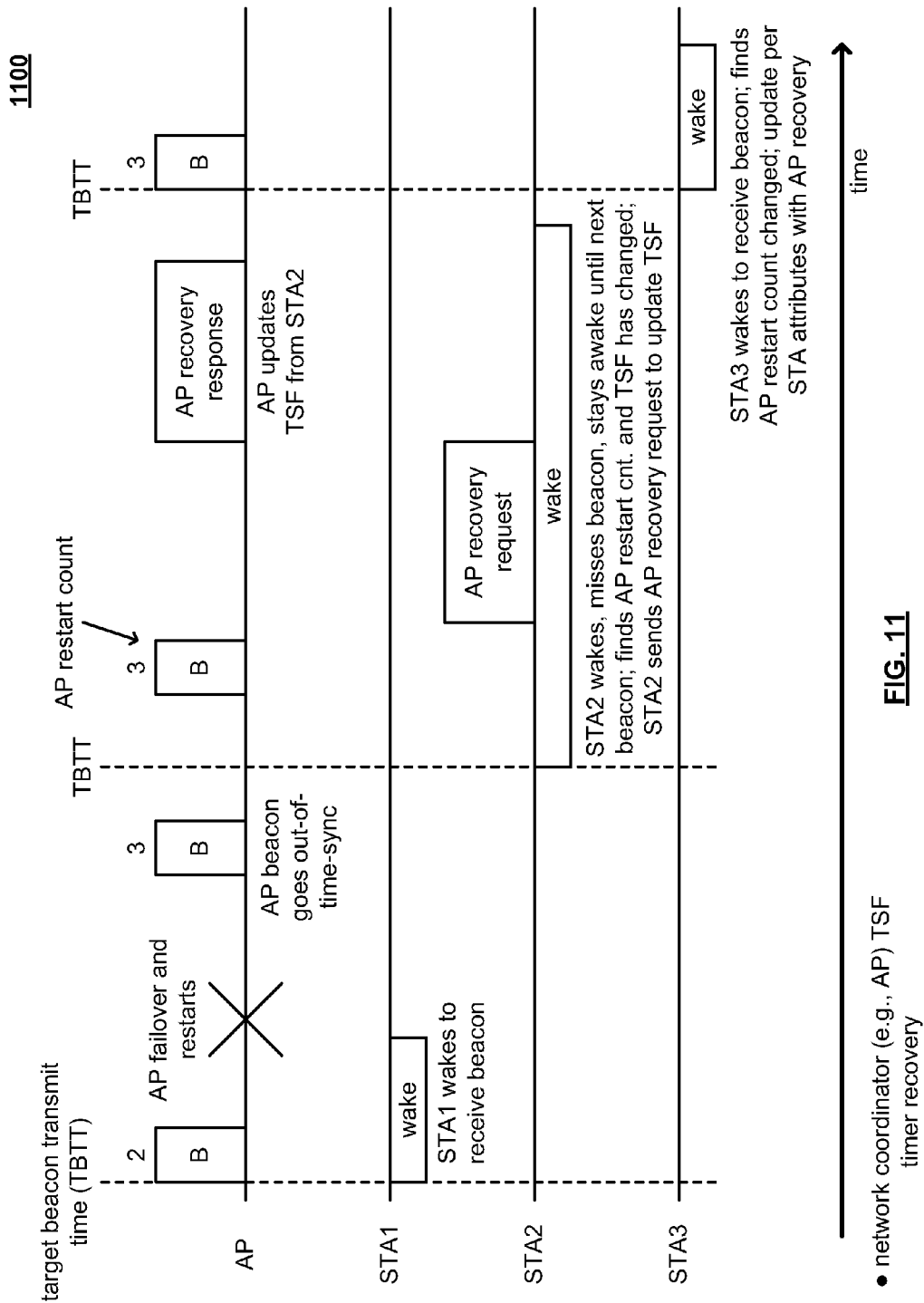
FIG. 11 illustrates an embodiment of network coordinator (e.g., access point (AP)) timing synchronization function (TSF) timer recovery.

FIG. 11 illustrates an embodiment 1100 of network coordinator (e.g., access point (AP)) timing synchronization function (TSF) timer recovery. It is noted here that general references to a network coordinator and/or AP may be used interchangeably without loss of generality. While it is noted that an AP is a specific example of one type of network coordinator, embodiments and/or diagrams included herein employing an AP therein may alternatively be modified by generally employing a network coordinator therein without departing from the scope and spirit of the invention.

As may be seen with respect to this diagram, after an AP effectuate a restart, the AP beacon associated there with would go out of time synchronization. That is to say, the AP would not know exactly when you should send out its beacon based upon the resetting of the TSF timer therein. However, after a given wireless device (STA2) awakens and misses a beacon, then that given device could stay awake until the next beacon. Using any one of the approaches presented herein to determine or identify an AP restart, the device may determine that the AP restart count and/or the TSF is changed. Based upon such determination, this given device could send an AP recovery request to the AP to update the TSF associated with the AP. In response, the AP could transmit an AP recovery response (e.g., an acknowledgment) back to that device that has provided the AP recovery request indicating the success or failure of the updating of the TSF timer within the AP. As may be understood, such a given device (e.g., STA2) wakes up but does not receive the beacon at the expected time, so that given device stays awake for a relatively long time. When a beacon is eventually received from the AP, the AP beacon will indicate that (1) the AP has restarted (e.g., based on restart count and will consequently have lost association information related to the respective devices within the system) and also indicate (2) which information needs to be required from one or more of the devices (e.g., STAs) within the system. As they be understood, such operations may effectuate getting the AP back to its original clock, so that there is no need to perform resynchronization with all of the other respective devices within the system (which can number several thousand in certain embodiments). In such an implementation, only the AP needs to undergo resynchronization with its prior or original clock.

Consequently, another subsequent device (e.g., STA3) will awake at the appropriate time to receive a beacon from the AP, just as yet another device (e.g., STA1) appropriately awoke at the appropriate time to receive a beacon from the AP prior to the AP restart. However, this particular device (e.g., STA3) will also determine that the AP restart count has changed, and certain updating may occur in relation to one or more device attributes with such an AP recovery.

FIG. 12 illustrates an embodiment 1200 of storing session encryption key. To avoid a repeat association and authentication operations to be performed after every AP restart, such an AP may store certain information therein within NVRAM for each respective associated device within the system. For example, the AP may store the session encryption key (Master Session Key) in NVRAM for each respective associated device within the system. Such operation may obviate the need for uplink data retransmission from decryption failures. The table depicted within this diagram shows an embodiment of possible sizes associated with different types of decryption keys.

Figure 13:
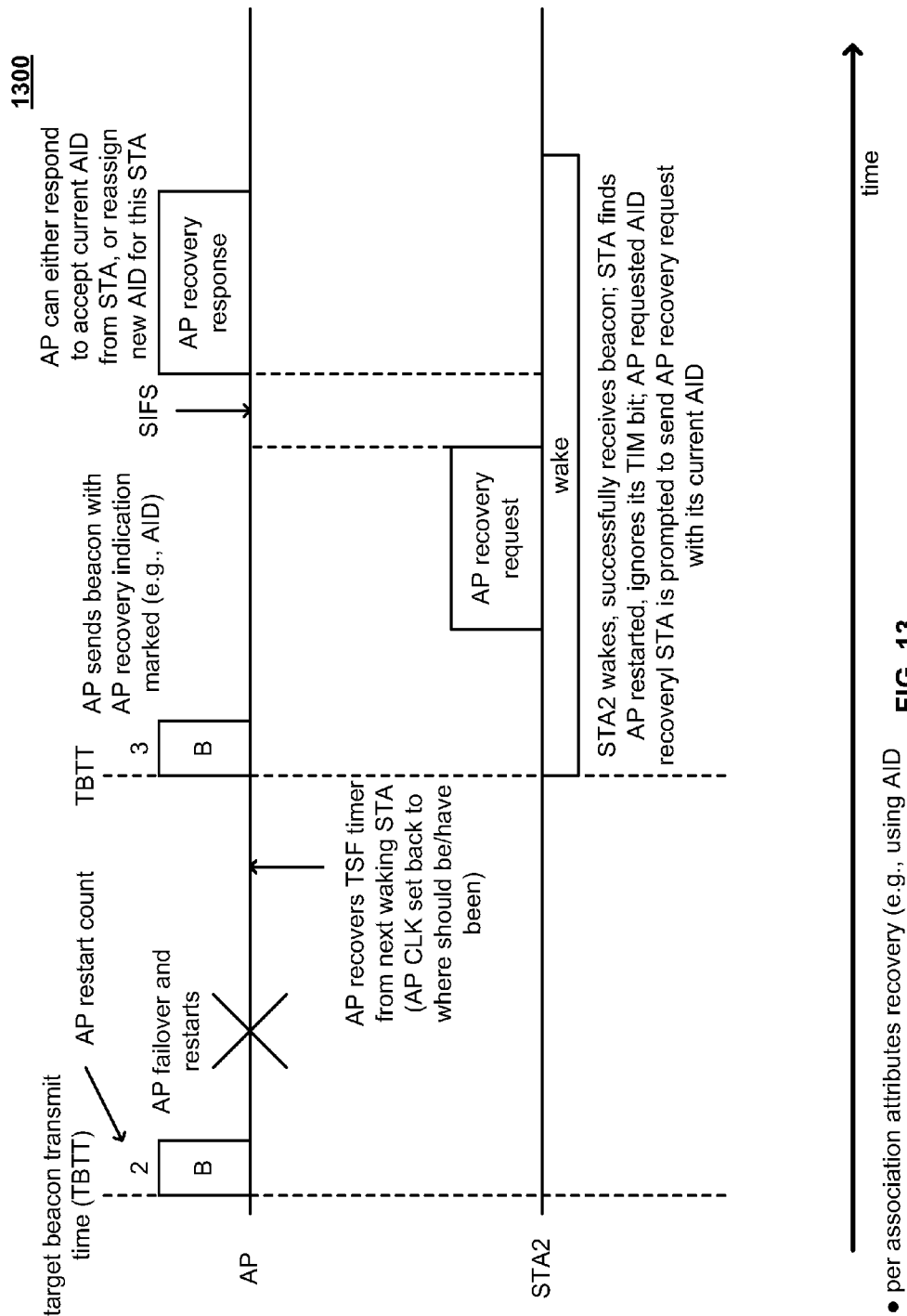
FIG. 13 illustrates an embodiment of per association attributes recovery.

FIG. 13 illustrates an embodiment 1300 of per association attributes recovery. As may be understood, a number of different respective attributes may be associated with the different respective devices within a given system. To minimize the amount of information that would need to be stored within an AP (e.g., such as within NVRAM therein), per device attributes at the AP can be restored from each respective device. For example, such association attributes may be related to any of a number of parameters including target weight time (TWT), association ID (AID), and/or any other parameter, etc.

Each respective device may detect that the AP has lost state (e.g., lost per association attributes) based upon an AP restart count. In response to such detection, a given device may send an AP recovery request as requested through an AP recovery indication. Upon receipt of such an action frame, an AP may either update one or more of the values of these attributes or reassign new values associated with one or more of these values and notify that particular device in the AP recovery response frame (e.g., the acknowledgment).

In certain embodiments, the TSF alone is insufficient to indicate that the AP has in fact restarted or rebooted. For example, since the TSF may have been restored by an earlier device, certain embodiments may preferentially use the AP restart count (e.g., such as described with reference to FIG. 10) to indicate any reboot or restart of the AP. Of course, it is noted that different respective implementations may prefer one manner of indicating AP restart or reboot over another.

As may be understood with respect to FIG. 13, recovery of per association attributes (e.g., using AID in this exemplary embodiment) may be made in accordance with the AP recovery request/response exchange between a given device in the AP. Again, it is noted that while recovery of AID is described with reference to this diagram, any desired per association attribute may be analogously recovered using such an approach. As may be seen with respect to the diagram, the AP undergoes a restart, and the AP then recovers the TSF timer from one of the devices within the system (e.g., the next waking STA). In a subsequently transmitted beacon from the AP, and AP recovery indication is marked therein (e.g., indicating AID in one particular embodiment). A given device wakes and successfully receives a beacon, determines that the AP has in fact restarted or rebooted, and therefore ignores its traffic indication map (TIM) bit. The AP has requested recovery of a particular attribute associated with the device (e.g., AID), and the given device is then prompted to send the AP recovery request with that particular attribute information therein (e.g., its current AID). In response to the information of that particular attribute provided within the AP recovery request, the AP may then either respond by accepting the information included therein (e.g., accepting the current AID from the STA) or by reassigning a new attribute for that particular device (e.g., reassigning a new AID for that STA).

As may be understood with respect to the various diagrams, embodiments, etc. herein, the restart of a network coordinator (e.g., AP) can result in performance loss and unreliable operation of other respective devices within the system. Herein, a number of different approaches have been presented to detect whether or not an AP has restarted or rebooted as well as a number of different approaches by which the per device association attributes may be restored with minimal downtime. Such determination of AP restart/reboot and per device association attribute restoration may be achieved with relatively minimal network management costs.

As may be understood, various approaches are presented herein by which a restart or reset of a communication device (e.g., access point (AP)) may be determined, including analyzing the signal provided or received from such a communication device. For example, a processor in such a communication device (e.g., wireless station (STA)) may operate to determine that the other communication device has undergone the restart or reset when a timing synchronization function (TSF) value within the first signal is different than (e.g., less than) an expected TSF value. Alternatively, a processor in such a communication device (e.g., wireless station (STA)) may operate to determine that the at least one additional apparatus has undergone the restart or reset based on a restart count value within the first signal.

For example, a receiver communication device (e.g., STA) may receive a communication from another communication device (e.g., AP). Then, based on analysis of the receiver communication device (e.g., STA) may assume that the other communication device (e.g., AP) has undergone a restart or reset. In addition, the receiver communication device (e.g., STA) may also check if a particular (singular) bit in that communication is set to a particular or predetermined value to indicate that the other communication device (e.g., AP) wants the (at least one) receiver communication device (e.g., STA) to send its respective current TSF value to the other communication device (e.g., AP) so that the other communication device (e.g., AP) can reset its respective TSF value to that which is received from the (at least one) receiver communication device (e.g., STA).

For example, 1 bit may be indicated within this communication from the other communication device (e.g., AP) to indicate whether the other communication device's (e.g., AP's) TSF is currently synchronized or not. Some further comments are provided below, in which such another communication device may generally be referred to as an AP, and one or more receiver communication devices may generally be referred to as STA(s). In accordance with the currently developing IEEE 802.11ah/TGah, there are non-traffic indication map (TIM) power save (PS) and target wake time (TWT) STAs scheduled some time into the future. After an AP reboots, the AP would be creating a new schedule for STAs, but non-TIM PS and TWT STAs are still operating with the old schedule. Also, such an AP has no idea how to avoid non-TIM PS and TWT STAs using the old schedule. By recovering the TSF (e.g., such as from a communication from one of the STAs) and using old schedule information, AP may then rebuild a new schedule around these STAs. Hence, detecting if AP has restarted may not necessarily be enough in all circumstances. For example, instead of 8-bit restart count and for TSF recovery, a 1-bit indication may be used to signal whether AP TSF is currently synchronized or not with other STAs in the BSS.

Such a (singular) bit being set to a predetermined value (e.g., 0 or 1, depending on the desired implementation) indicates AP is currently not TSF-synchronized. If it is not set, then the AP requests the TSF from one or more of the STAs, the STAs may choose to send its respective TSF to AP, and the STAs do not correct their own respective TSF using the AP's TSF value.

An AP may preserve per-STA association information (e.g., such as using security keys). As such, an AP may also be implemented to keep the old schedule information. An AP may be operative such that it prefers not to inform a waking STA to know that it blacked out (e.g., reset or restarted). Also, it may be preferable that such an AP will not have interference from a previous schedule (e.g., AP wants to recover old schedule and keep using it). As such, an AP may need an old TSF to avoid letting STA know that it blacked out (e.g., the AP needs old TSF to re-use old schedule).

Such an AP may then employ such a bit to request old TSF from a STA that wakes. Based on this, such an AP may correct the new TSF value to match the old TSF value. The waking STA that sees that the bit is set will know that it does not need to undergo re-association, even though it sees that the AP TSF is different than the STA TSF (e.g., AP TSF<STA TSF). Later waking STA(s) will then see the expected TSF and therefore, and correctly recognize that it/they do not need to associate again. Also, a STA that sees the bit set will not its respective local TSF.

In the situation that an AP loses per-STA association information, then each respective STA wakes operates knowing that it needs to initiate an association. For example, each STA examines TSF and sees that the AP TSF is different than the STA TSF (e.g., AP TSF<STA TSF). In some embodiments, if AP TSF<STA TSF and bit is not set, then the STA initiates association. Therefore, AP resets TSF at restart to allow STA to perform this test. In some embodiments, an AP may operate to avoid old wake times, of which it has a record, and this may potentially be at odds with the fact that it has lost all association information. An AP can ask for an old TSF in order to allow an offset correction to know how old schedule fits against current TSF values, allowing the AP to avoid overlapping the old schedule with a new one. Such an AP need not adjust restarted TSF when it receives old TSF, and a STA that sees the bit set need not modify its local TSF.

Figure 14:
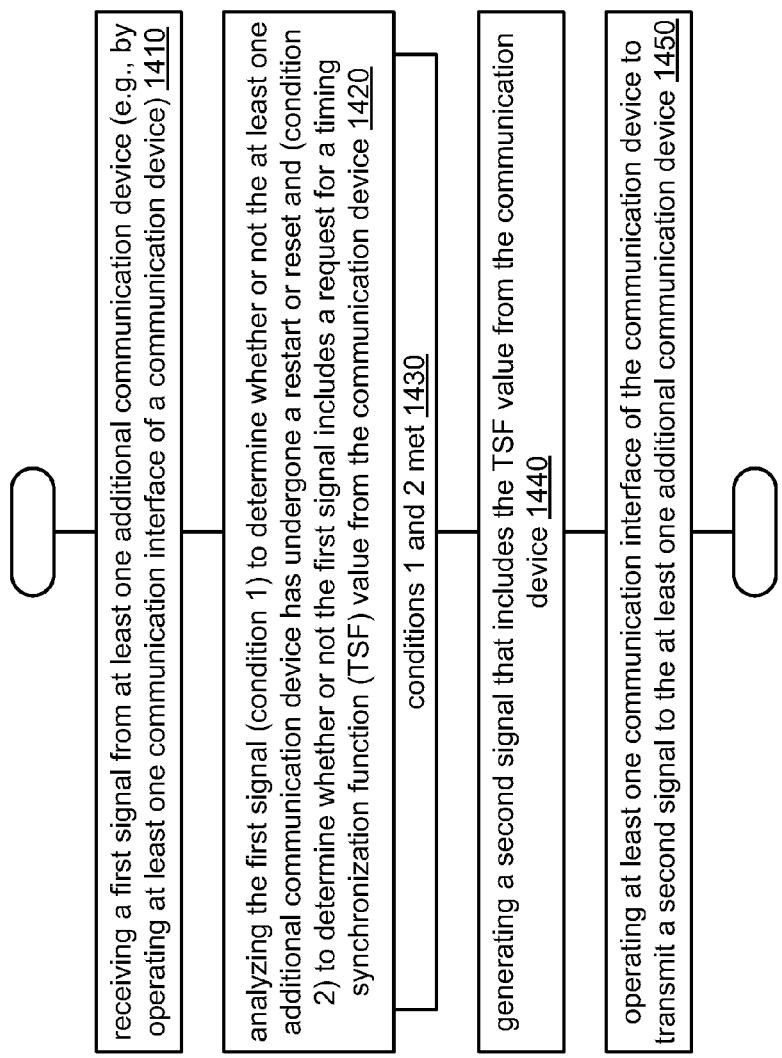
FIG. 14 is a diagram illustrating an embodiment of a method for operating one or more wireless communication devices.

FIG. 14 is a diagram illustrating an embodiment of a method for operating one or more wireless communication devices. Referring to method 1400 of FIG. 14, the method 1400 begins by receiving a first signal from at least one additional communication device (e.g., by operating at least one communication interface of the communication device to), as shown in a block 1410.

The method 1400 continues by analyzing the first signal (condition 1) to determine whether or not the at least one additional communication device has undergone a restart or reset and (condition 2) to determine whether or not the first signal includes a request for a timing synchronization function (TSF) value from the communication device, as shown in a block 1420. If both of these conditions 1 and 2 are met (e.g., upon determination that the at least one additional communication device has undergone the restart or reset and upon determination that the first signal includes the request for the TSF value from the communication device), as shown in a block 1430.

The method 1400 then operates by generating a second signal that includes the TSF value from the communication device, as shown in a block 1430. The method 1400 continues by operating at least one communication interface of the communication device to transmit a second signal to the at least one additional communication device, as shown in a block 1440.

It is also noted that the various operations and functions as described with respect to various methods herein may be performed within a wireless communication device, such as using a processor, processing circuitry, baseband processing module and/or a processing module implemented therein, (e.g., such as in accordance with the baseband processing module 64 and/or the processing module 50 as described with reference to FIG. 2, the equivalent of which may be implemented as processors, processing circuitries, etc.) and/or other components therein. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
   at least one communication interface configured to receive a first signal from an access point (AP); and
   a processor configured to:
      analyze the first signal to determine whether or not the AP has undergone a restart or reset;
      determine whether or not the first signal includes a request for a timing synchronization function (TSF) value from the apparatus based on a singular bit within the first signal being set to a predetermined value; and
      upon determination that the AP has undergone the restart or reset and upon determination that the first signal includes the request for the TSF value from the apparatus, generate a second signal that includes the TSF value from the apparatus; and wherein:
   the at least one communication interface configured to transmit the second signal to the AP;
   the apparatus being one wireless station (STA) of a plurality of wireless stations (STAs);
   before the AP has undergone the restart or reset, the plurality of STAs configured to awaken respectively at a first plurality of target wake times (TWTs) in accordance with a first schedule; and
   after the AP has undergone the restart or reset, the plurality of STAs configured to awaken respectively at a second plurality of TWTs in accordance with a second schedule.

2. The apparatus of claim 1, wherein the processor is further configured to:
   determine that the AP has undergone the restart or reset when a TSF value within the first signal is different than an expected TSF value.

3. The apparatus of claim 1, wherein the processor is further configured to:
   determine that the AP has undergone the restart or reset based on a restart count value within the first signal.

4. The apparatus of claim 1, wherein the AP is further configured to:
   generate the second schedule based on a time reference that is based on the TSF value received from the apparatus.

5. The apparatus of claim 1, wherein the AP is further configured to:
   reset or adjust a local TSF value therein based on the TSF value included within the second signal from the apparatus.

6. An apparatus comprising:
   at least one communication interface configured to receive a first signal from at least one additional apparatus; and
   a processor to:
      analyze the first signal to determine whether or not the at least one additional apparatus has undergone a restart or reset and to determine whether or not the first signal includes a request for a timing synchronization function (TSF) value from the apparatus; and
      upon determination that the at least one additional apparatus has undergone the restart or reset and upon determination that the first signal includes the request for the TSF value from the apparatus, generate a second signal that includes the TSF value from the apparatus; and
   the at least one communication interface configured to transmit the second signal to the at least one additional apparatus.

7. The apparatus of claim 6, wherein the processor is further configured to:
   determine that the at least one additional apparatus has undergone the restart or reset when a TSF value within the first signal is different than an expected TSF value.

8. The apparatus of claim 6, wherein the processor is further configured to:
   determine that the at least one additional apparatus has undergone the restart or reset based on a restart count value within the first signal.

9. The apparatus of claim 6, wherein the processor is further configured to:
  determine that the first signal includes the request for the TSF value from the apparatus based on a singular bit within the first signal being set to a predetermined value.

10. The apparatus of claim 6, wherein:
  the apparatus being one wireless station (STA) of a plurality of wireless stations (STAs);
  before the at least one additional apparatus has undergone the restart or reset, the plurality of STAs configured to awaken respectively at a first plurality of target wake times (TWTs) in accordance with a first schedule; and
  after the at least one additional apparatus has undergone the restart or reset, the plurality of STAs configured to awaken respectively at a second plurality of TWTs in accordance with a second schedule.

11. The apparatus of claim 10 further comprising:
  the at least one additional apparatus configured to generate the second schedule based on a time reference that is based on the TSF value received from the apparatus.

12. The apparatus of claim 6 further comprising:
  the at least one additional apparatus configured to reset or adjust a local TSF value therein based on the TSF value included within the second signal from the apparatus.

13. The apparatus of claim 6, wherein:
  a wireless station (STA), wherein the at least one additional apparatus being an access point (AP).

14. A method for execution by a communication device, the method comprising:
  operating at least one communication interface of the communication device to receive a first signal from at least one additional communication device;
  analyzing the first signal to determine whether or not the at least one additional communication device has undergone a restart or reset and to determine whether or not the first signal includes a request for a timing synchronization function (TSF) value from the communication device; and
  upon determination that the at least one additional communication device has undergone the restart or reset and upon determination that the first signal includes the request for the TSF value from the communication device:
    generating a second signal that includes the TSF value from the communication device; and
    operating at least one communication interface of the communication device to transmit the second signal to the at least one additional communication device.

15. The method of claim 14 further comprising:
  determining that the at least one additional communication device has undergone the restart or reset when a TSF value within the first signal is different than an expected TSF value.

16. The method of claim 14 further comprising:
  determining that the at least one additional communication device has undergone the restart or reset based on a restart count value within the first signal.

17. The method of claim 14 further comprising:
  determining that the first signal includes the request for the TSF value from the communication device based on a singular bit within the first signal being set to a predetermined value.

18. The method of claim 14, wherein:
  the communication device being one wireless station (STA) of a plurality of wireless stations (STAs); and
  further comprising:
  before the at least one additional communication device has undergone the restart or reset, the plurality of STAs operating by awakening respectively at a first plurality of target wake times (TWTs) in accordance with a first schedule; and
  after the at least one additional communication device has undergone the restart or reset, the plurality of STAs operating by awakening respectively at a second plurality of TWTs in accordance with a second schedule.

19. The method of claim 14 further comprising:
  the at least one additional communication device operating by resetting or adjusting a local TSF value therein based on the TSF value included within the second signal from the communication device.

20. The method of claim 14, wherein
  the communication device being a wireless station (STA), and
  the at least one additional communication device being an access point (AP).

* * * * *